US012566631B2

(12) United States Patent
Originale Di Criscio et al.

(10) Patent No.: US 12,566,631 B2
(45) Date of Patent: Mar. 3, 2026

(54) HIGH PERFORMANCE COMPUTING ARCHITECTURES FOR WORK OF ART COMPETITIONS

(71) Applicant: Musixster, LLC, Beverly Hills, CA (US)

(72) Inventors: Alessandro Originale Di Criscio, Beverly Hills, CA (US); Francesco Claude Originale Di Criscio, Beverly Hills, CA (US)

(73) Assignee: MUSIXSTER, LLC, Beverly Hills, CA (US)

( * ) Notice: Subject to any disclaimer, the term of this patent is extended or adjusted under 35 U.S.C. 154(b) by 672 days.

(21) Appl. No.: 18/056,311

(22) Filed: Nov. 17, 2022

(65) Prior Publication Data

US 2024/0169448 A1      May 23, 2024

(51) Int. Cl.
*G06F 9/48* (2006.01)
*G06Q 50/00* (2012.01)
(52) U.S. Cl.
CPC ........... *G06F 9/4881* (2013.01); *G06Q 50/01* (2013.01)
(58) Field of Classification Search
CPC .............................. G06F 9/4881; G06Q 50/01
See application file for complete search history.

(56) References Cited

U.S. PATENT DOCUMENTS 7,162,433 B1      1/2007 Foroutan
9,669,299 B2 *    6/2017 Originale Di Criscio ...................
                                                          A63F 13/35
9,981,192 B2      5/2018 Criscio et al.
(Continued)

FOREIGN PATENT DOCUMENTS

WO          0241211  A1    5/2002
WO    2015134461  A1    9/2015

OTHER PUBLICATIONS

Cunningham et al.., "IEEE 802.12 Gigabit Lan," IEEE 802.12, accessed through wayback machine, https://web.archive.org/web/20080615000000*/http://www.hpl.hp.com/techreports/96/HPL-96-63.pdf, pp. 1-3 (Nov. 21, 2008). (U.S. Appl. No. 17/370,661).

(Continued)

*Primary Examiner* — Wissam Rashid

(74) *Attorney, Agent, or Firm* — Perilla Knox & Hilebrandt LLP; Thomas B. Hildebrandt

(57)                    ABSTRACT

Disclosed are various embodiments for high performance computing architectures used in work of art competition systems. In one embodiment, a system includes a generator module and a planner module. The generator module receives data to be used in generating an element representation and generates the element representation based at least in part on a particular state change operation. The generator module is configured to generate a single element representation after merging a plurality of state change operations into the particular state change operation. The planner module assigns an identifier to the element representation to order the element representation relative to at least one previous element representation, orders the element representation in a queue system comprising one or more queues based at least in part on an identifier, assigns a precedence value to the element representation, and generates a plan for an interfacing unit based at least in part on the element representation.

20 Claims, 4 Drawing Sheets

(56) References Cited

U.S. PATENT DOCUMENTS

| | | | |
|---|---|---|---|
| 9,999,299 B2 | 6/2018 | Neuwirth et al. | |
| 2003/0236832 A1 | 12/2003 | McIntyre et al. | |
| 2007/0169165 A1 | 7/2007 | Crull et al. | |
| 2007/0244570 A1 | 10/2007 | Speiser et al. | |
| 2008/0126197 A1 | 5/2008 | Savage et al. | |
| 2009/0198575 A1 | 8/2009 | Kapila | |
| 2009/0234744 A1 | 9/2009 | Kapila | |
| 2010/0121857 A1 | 5/2010 | Elmore et al. | |
| 2011/0225024 A1 | 9/2011 | Seyer et al. | |
| 2011/0300916 A1 | 12/2011 | Patchen | |
| 2012/0123570 A1 | 5/2012 | Guinn | |
| 2012/0179557 A1 | 7/2012 | Gross | |
| 2012/0215708 A1 | 8/2012 | Polk | |
| 2013/0157737 A1 | 6/2013 | Daly | |
| 2013/0204692 A1* | 8/2013 | Mallory ................. | G06Q 30/02 |
| | | | 705/14.66 |
| 2013/0237323 A1 | 9/2013 | Alman et al. | |
| 2015/0120446 A1 | 4/2015 | Judd et al. | |
| 2015/0127127 A1 | 5/2015 | Carpenter et al. | |
| 2015/0161663 A1 | 6/2015 | Klein et al. | |
| 2015/0222945 A1 | 8/2015 | Jackson et al. | |
| 2015/0246281 A1 | 9/2015 | Criscio et al. | |
| 2016/0240026 A1 | 8/2016 | Wise | |
| 2017/0189817 A1 | 7/2017 | Criscio et al. | |
| 2018/0256985 A1 | 9/2018 | Criscio et al. | |
| 2020/0016496 A1 | 1/2020 | Criscio et al. | |

OTHER PUBLICATIONS

Final Office Action for U.S. Appl. No. 14/195,315 (Dec. 15, 2014).
Final Office Action for U.S. Appl. No. 14/195,315 (Jan. 20, 2016}.

International Search Report and the Written Opinion of the International Searching Authority for International Application No. PCT/US15/18439 (Jun. 24, 2015).

Maranzani, "5 Facts About Pearl Harbor and the USS Ariziona," http://www.history.com/news/5-facts-about-pearl- harbor-and-the-uss-arizona, pp. 1-3 (Dec. 7, 2011) (U.S. Appl. No. 17/370,661).

Non-Final Office Action for U.S. Appl. No. 14/195,315 (Aug. 15, 2014).

Non-Final Office Action for U.S. Appl. No. 14/195,315 (Jun. 23, 2015).

Non-Final Office Action for U.S. Appl. No. 15/468,019 (Jul. 25, 2017).

Non-Final Office Action for U.S. Appl. No. 15/977,775 (Jun. 24, 2019).

Non-Final Office Action for U.S. Appl. No. 16/580,589 (Apr. 8, 2021).

Non-Final Office Action for U.S. Appl. No. 17/370,661. (Aug. 24, 2023).

Notice of Allowance and Fee(s) Due for U.S. Appl. No. 14/195,315 (Jan. 30, 2017).

Notice of Allowance and Fee(s) due for U.S. Appl. No. 14/195,315 (Oct. 26, 2016).

Notice of Allowance and Fee(s) Due for U.S. Appl. No. 15/468,019 (Jan. 30, 2018).

Olympedia, Ancient Artistic Competitions, printed Aug. 21, 2023, https://www.olympedia.org/sports/AAR (Year: 2023) (U.S. Appl. No. 17/370,661).

Wikipedia Article on National Oldtime Fiddlers' Contest, https://en.wikipedia.org/wiki/National_Oldtime_Fiddlers'_Contest, pp. 1-3.

* cited by examiner

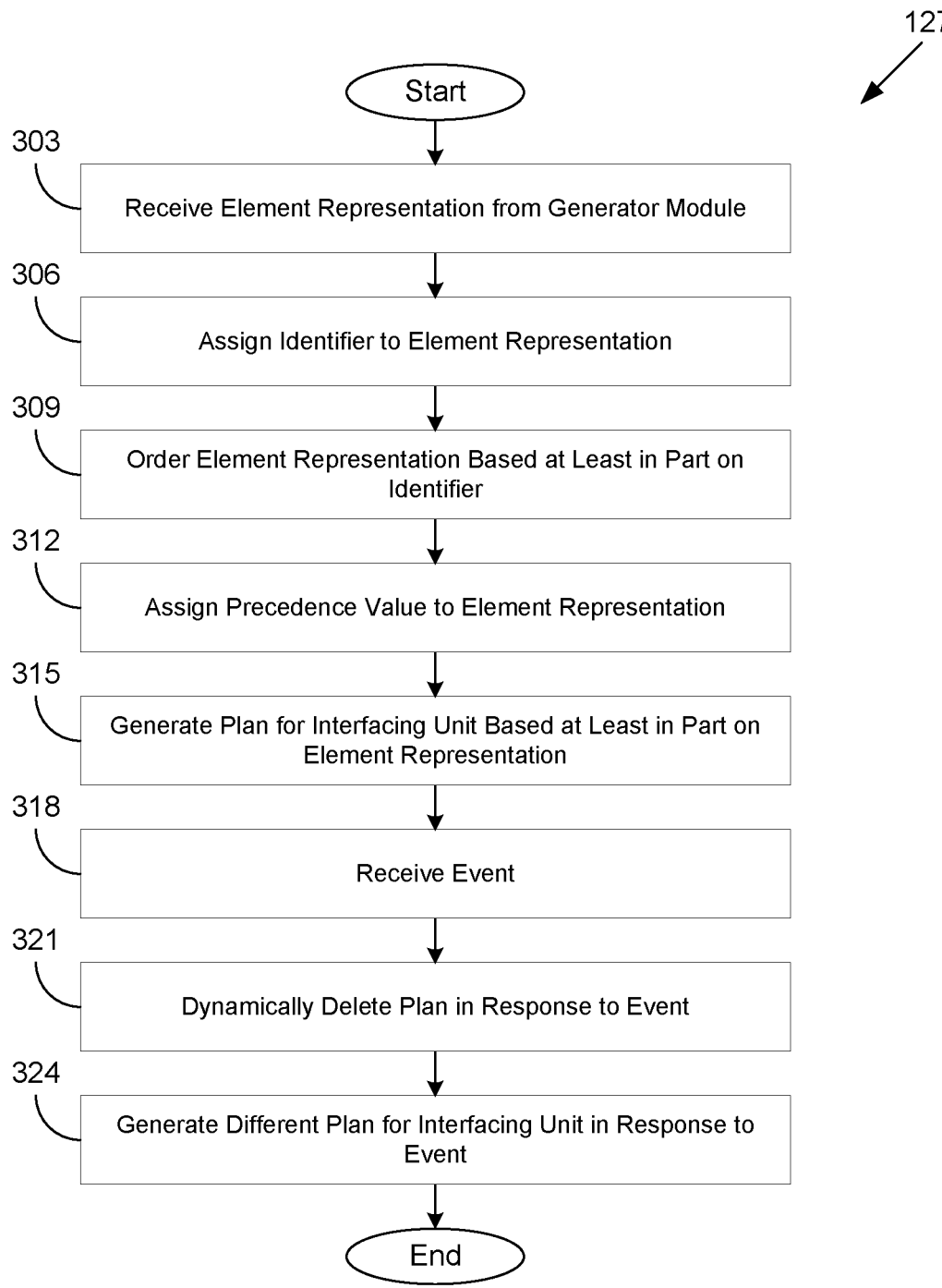

127

Start

303 Receive Element Representation from Generator Module

306 Assign Identifier to Element Representation

309 Order Element Representation Based at Least in Part on Identifier

312 Assign Precedence Value to Element Representation

315 Generate Plan for Interfacing Unit Based at Least in Part on Element Representation 318 Receive Event 321 Dynamically Delete Plan in Response to Event 324 Generate Different Plan for Interfacing Unit in Response to Event End

FIG. 3

HIGH PERFORMANCE COMPUTING ARCHITECTURES FOR WORK OF ART COMPETITIONS

BACKGROUND

Artists can create works of many different forms, through many different media, including musical compositions, visual and graphical arts, theatrical presentations, and even culinary creations. The act of experiencing artistic works can be enhanced by engaging an audience comprising a wide variety of both artists and other users to review works of art through an online social networking environment, for example. Many conventional media for communicating information about artistic works do not provide sufficient means for users to express their opinions regarding the relative worth of different works of art. Likewise, artists do not have an adequate outlet or communication medium to showcase their talents and to compare their works of art against other artists within similar fields of artistic endeavor. In addressing issues with current methods and systems for experiencing and evaluating works of art, more effective computer-implemented tools, strategies, and techniques are needed to help artists and other users to share and compare works of art, and ultimately to enhance their enjoyment of different artistic creations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a flowchart illustrating one example of functionality implemented as portions of a planner module executed in a computing environment in the networked environment of FIG. 1 according to various embodiments of the present disclosure.

SUMMARY

Figure 1:
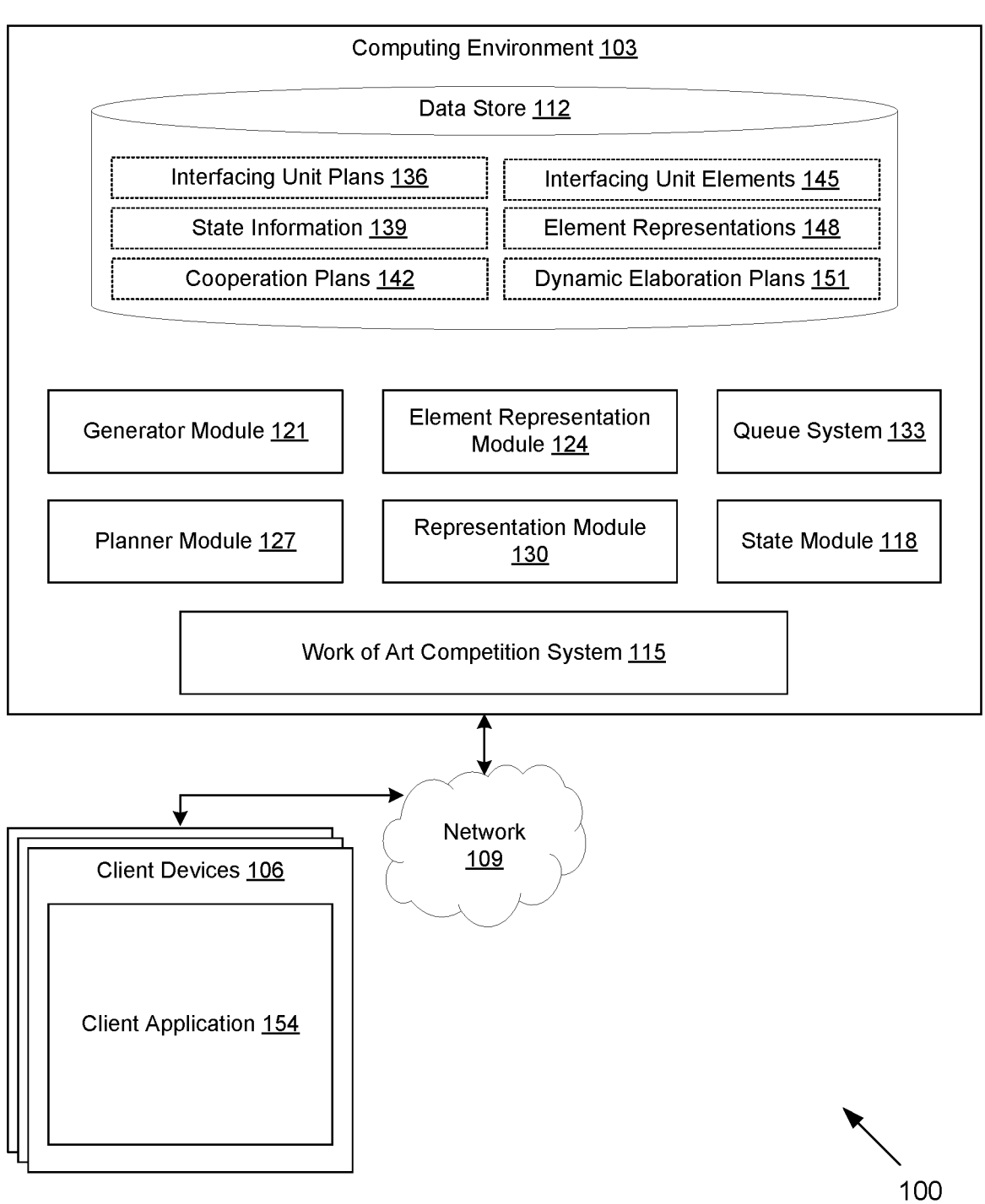
FIG. 1 is a schematic block diagram of a networked environment according to various embodiments of the present disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system. The system also includes at least one computing device. The system also includes a generator module executable in the at least one computing device, where when executed the generator module causes the at least one computing device to at least: receive data to be used in generating an element representation; evaluate instructions to generate the element representation; generate the element representation based at least in part on a particular state change operation, where the generator module is configured to generate a single element representation after merging a plurality of state change operations into the particular state change operation.

The system also includes a planner module executable in the at least one computing device, where when executed the planner module causes the at least one computing device to at least: receive the element representation from the generator module, assign an identifier to the element representation to order the element representation relative to at least one previous element representation, order the element representation in a queue system comprising one or more queues based at least in part on an identifier, assign a precedence value to the element representation, and generate a plan for an interfacing unit based at least in part on the element representation. Other embodiments of this aspect include corresponding computer systems, apparatus, and computer programs recorded on one or more computer storage devices, each configured to perform the actions of the methods.

Implementations may include one or more of the following features. The system includes one or more modules that are configurable to use high performance computing architectures for work of art competitions. The planner module is further configured to at least: receive an event; dynamically delete the plan that is currently being generated in response to the event; and generate a different plan for the interfacing unit in response to the event. The planner module is further configured to splinter a particular operation into a plurality of operations for parallel and/or concurrent execution. The planner module is further configured to generate the plan based at least in part on a work completion time limit or in response to one or more state changes when interfaced with the state module. The planner module in other scenarios may generate a plan in relation to tasks or operations present in the queue system, which may take into account precedence values associated with the tasks or operations. When executed the state module causes the at least one computing device to at least: manage one or more states; perform at least one of: a create operation, a read operation, an update operation, or a delete operation on the one or more states; and expose one or more interfaces for the generator module and the planner module to interact with the one or more states. The state module is further configured to at least maintain a perpetual network connection to a work of art competition system. The state module is further configured to at least prevent data duplication, out of order data, and expired data. The element representation further may include an element representation module executable in the at least one computing device, where when executed the element representation module causes the at least one computing device to at least: generate one or more interfacing unit elements based at least in part on a set of instructions and one or more data structures. When executed the representation module causes the at least one computing device to at least: receive the plan for the interfacing unit from the planner module; and generate the interfacing unit based at least in part on the plan for the interfacing unit. Implementations of the described techniques may include hardware, a method or process, or computer software on a computer-accessible medium.

DETAILED DESCRIPTION

The present disclosure relates to high performance computing architectures for use in work of art competition systems and/or other systems. Work of art competition systems present numerous issues that can be improved upon with the proper computing architecture. For example, position numbers, artist names, and their score points have to be continuously updated as every artist engages in competitions, earns points, loses points, move up or down in a ranking. The music generic ranking can include thousands of artists continuously operating in the competition systems. Various embodiments of the present disclosure introduce a generator module capable of processing an extremely high quantity of granularly updated ranking versions in just milliseconds and part of their ranking data can be still congruous with the previous data. The process as described now only operates on the new data that is incongruous with the previous ranking data and makes use of the already processed data that is congruous between the current and newer ranking version.

As one skilled in the art will appreciate in light of this disclosure, certain embodiments may be capable of achieving certain advantages, including some or all of the following: (1) building one or more complex applications while enabling high performance; (2) providing efficient instruction processing on data change; (3) providing optimized executions upon changes; (4) providing more flexible processing modes; (5) providing more flexible execution stages; (6) providing splinter and independent task processing; (7) more efficiently organizing hardware resource allocations; (8) providing distinctive executions; (9) enhancing processing by system collectivity; and so forth.

As will be described, the present disclosure can be used to build one or more complex applications while enabling high performance. Software complexity constantly increases. In fact, applications are required to include always more features, to utilize more resources, to process more instructions and data. This complexity issue affects the field of computer systems conducting competition involving works of art. Optimization techniques require configurations in order to work and be effective. Software applications may have multiple running operations and/or operation sets, and each of them can be uniquely addressed and/managed to be best optimized. The operations should be able to interact and work in conjunction with each other, no matter how different they are.

Design goals for a work of art competition system may be that it be autonomous in individual ones of its inner parts, able to be configurable both as a whole and independently in its parts, and compositable of one or more parts working together that can perform different operations and/or be constituted by different characteristics. The architectures constituted by representations, generators, and planners, as described herein, achieve the objective of building complex applications enabling high performance. The planner may be regarded as the architecture (or sub-architecture) in charge of integrating generators' architectures, is configurable, and/or can configure the associated architectures and operations. Generators may represent a specific set of operations and/or to have jurisdiction over defined part(s) of an interfacing unit or element representations, are configurable and may configure the associated element representation architectures. Element representation architectures may contain data and instructions for interfacing unit elements and are configurable. The architectures, involved together, enable a complex application to be autonomous (as a whole or in its parts), configurable (as whole and/or in its parts) and compositable regardless of the technical nature, configuration requirements, optimization techniques, or operations of its parts.

The present disclosure may also provide efficient instruction processing on data change. In particular, the system can be instructed to employ hardware resources in the cases that result in new element representations, while reutilizing the already generated representations.

The present disclosure may also provide optimized executions over changes. In one scenario, an interfacing unit (or the entire system) may be composed by multiple parts by multiple generators (and their associated element representation architectures). An interaction, an event, or an update (such as a network response) may cause not only one but a plurality of changes, for example, in the system, in the data store or in the interfacing unit or in any other part of system. For example, an artist may click on a challenge button, and therefore the appearance of the button has to change because he cannot send anymore challenge requests and his statistics on the quantity of challenges he sent have to be updated. In the example above, it may not be needed to process the two changes in two separate "generations" from a user perspective, and it is not required by a system perspective. As will be described, the system and/or architecture can be configured to handle one or more changes in a single process. In various embodiments, more than one generator is not required; one generator may be able to cause one or more than one change.

The present disclosure may also provide more flexible processing modes. A great variety of operations may occur in computer systems conducting work of art competitions and further configurations may be applied to improve performance, enabling systems to assess which operation order to run. For example, a voter, through the competition system, requests information of a battle to listen to and to vote: when the voter's system is waiting for the response, the voter's system may be able to run other instructions or process other data, such as an update of the notification number in the interfacing unit. As will be described, a competition system may be configured to organize the processing of sequential, concurrent, and/or parallel operations.

The present disclosure may also provide more flexible execution stages. For example, in a scenario, a particular operation is characterized by high processing cost, such as an interfacing unit element continuously displaying updated battle outcomes. Consequently, the operation may severely affect the system behavior and provoke issues such as stalling or delays in another part of the system, such as the processing of user specific updates, which may be less recurrent, or require less power, than the wider system battle updates. An architecture should enable systems to be capable of managing and executing any kind of operation in conjunction with each other. In order to build high performance computer systems conducting competition involving works of art, the system may be architected in stages that may be representing various executing tasks.

The present disclosure may also provide splinter and independent task processing. A recurring objective to reach, particularly in the resource intensive field of the computer systems conducting competition involving works of art, is the ability to fully control the ongoing operations, future operations, and the system behavior in relation to acknowledgeable factors such as inputs. Architectures providing such configurations achieve at least two ends: exercising an absolute direction over the machine and performance improvements.

The present disclosure may also more efficiently organize hardware resource allocations. For example, there can be activities or operations, system defined and/or user defined (such as static settings or dynamic settings, including the ones derived by users' behaviors), that may require more resources than others and/or may be privileged over others. Artist users, reviewing the challenges they have received or sent, may be more focused on this type of update. The interfacing unit may display many types of ongoing activities. The functioning of computer systems conducting competition involving works of art may be improved to provide capability for specifically allocating resources.

The present disclosure may also provide distinctive executions. Designing a competition system architecture comprising stages is a definitive improvement. There are scenarios where the system may be required to address them with additional enhancing procedures: a user may be viewing information related to a specific competition or genres, but the system may have scheduled operations in execution stages. The user may decide to view information of another competition. Therefore, there can be two user-caused operations, such as the system caused to request the information, and the interfacing unit displaying the information. The competition system may need to able to insert the two operations in its execution stages, assess whether to run their instructions, and in which mode to operate the instructions.

The present disclosure may also enhance processing by system collectivity. When computer systems running work of art competitions execute operations in concert, the systems may need additional configuration to further improve the performance. Multiple (any type of) entities such as element representations, for example, may be received by another system. The receiver system may have to be architected to be able to receive and display the representations, utilize the representations for updating and comparison operations, and be fully integrated as they were processed by the receiver system. As will be described, a system can be supplementarily organized to execute its tasks faster and be able to receive and integrate entities.

In the following discussion, a general description of the system and its components is provided, followed by a discussion of the operation of the same.

With reference to FIG. 1, shown is a networked environment 100 according to various embodiments. The networked environment 100 includes a computing environment 103 and one or more client devices 106, which are in data communication with each other via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a work of art competition system 115, one or more state modules 118, one or more generator modules 121, one or more element representation modules 124, one or more planner modules 127, one or more representation modules 130, a queue system 133 comprising one or more queues, and other applications, services, processes, systems, engines, or functionality not discussed in detail herein. The work of art competition system 115 is executed to stage an artistic competition. As applied herein, "works of art" may include a wide variety of artistic creations by different types of artists including, for example and without limitation, musical compositions (and mixing versions thereof), visual and graphical arts, theatrical presentations, and culinary creations, among others.

The work of art competition system 115 may employ web application software, for example, programmed for conducting online competitions and dedicated news and polling systems, among other features. An online competition environment can be provided with online tournaments in which artists compete against each other through a battle module with the aim to earn victory points to win and advance through a championship designation framework. The work of art competition system 115 may be programmed for uploading and comparing artists' songs, for example, which may be limited in certain embodiments to only original works created by the artists.

The competitions may be conducted by artists selecting audio/video tracks of their art works to be played, displayed, or otherwise accessed through the work of art competition system 115. Winners of these competitions can be determined by an online audience of users comparing works of art and casting votes to determine a winner, for example. Other features provided by the work of art competition system 115 may include polling, information, and news systems designed for processing communications related to works of art and related topics. Various embodiments can be configured to be accessed, for example, through a combination of web-based social network services, application software, and tablet and mobile device implementations, including various systems of interconnected computers and device networks. In other implementations, the high performance architectures described herein when implemented in a work of art competition system 115 can be implemented in any combination with any one of: a profile module, a battle module, a news module, a journal module, a store module, an analytical module, an automation module, an advertising module, a sales module, a communication module, a championship module, a scoring module, a ranking module, a correspondence module, a voter module, an artist module, a voting module, and/or other modules.

Various embodiments of a work of art competition system 115 are further described in U.S. Pat. No. 9,669,299, entitled "Conducting Artistic Competitions in a Social Network System," and issued on Jun. 6, 2017, which is incorporated herein by reference in its entirety.

The state module(s) 118 is executed to manage state information for the work of art competition system 115. For example, a state module 118 may be capable of performing create, read, update, delete, or other operations on the states that it manages. The state module 118 may also expose one or more interfaces for other modules and/or architectures to interact with its state.

The generator module(s) 121 interact with state module(s) 118 and can perform create, read, update, delete, or other operations on the associated modules and/or can perform operations outside its own module. The generation module(s) 121 may be locally stateful and may be able to perform create, read, update, delete, or other operations on its local states. The generator module(s) 121 may receive inputs and/or entities to be used in generations of element representations. The generator module(s) 121 may evaluate element generation instructions, such as including statements, data, or entities, for example. The generator module(s) 121 may also execute generation of element representations in relation to state changes of the associated state modules 118, local state of the generator module(s) 121, and/or the received inputs or entities. The generator module(s) 121 may also store information on state interfaces in use and merge the operations of the state interfaces to cause one execution of element representation generation instead of one for each state change operation. The generator module(s) 121 may also generate interfacing unit element representations. The generated element representations discussed above can be considered modules as well, as described below.

The element representation module(s) 124 may correspond to a set of instructions to generate one or more interfacing unit elements. The element representation module(s) 124 may correspond to data structures to generate one or more interfacing unit elements. The element representation module(s) 124 may correspond to data, values, information, and entities to generate one or more interfacing unit elements. The element representation module(s) 124 may correspond to data structures, data, values, information, or entities constituting or associated with one or more interfacing unit elements.

The planner module(s) 127 may receive element representation modules 124 from generator modules 121. The planner module(s) 127 may store information on state interfaces in use and merge the operations of the state interfaces to cause one execution instead of one for each state change operation. The planner module(s) 127 may elaborate interfacing unit plans comprising listing or describing the interfacing unit elements to be represented and the processes to be used to carry out the interfacing unit creation. The planner module(s) 127 may store interfacing unit plans. On further reception of element representation modules 124, the planner modules 127 may compare the representation modules 130 associated with the current plan with the successively received representation modules 130 and determining the changes for the plan and the processes to carry out the changes. The planner module(s) 127 may output current interfacing unit plans.

The representation module(s) 130 may receive and evaluate interfacing unit plans from planner modules 127. The representation module(s) 130 may also build interfacing units.

The data stored in the data store 112 includes, for example, one or more interfacing unit plans 136, state information 139, one or more cooperation plans 142, one or more interfacing unit elements 145, one or more element representations 148, one or more dynamic elaboration plans 151, and potentially other data.

The client device 106 is representative of a plurality of client devices 106 that may be coupled to the network 109. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 106 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 154 and/or other applications. The client application 154 may be executed in a client device 106, for example, to access network content served up by the computing environment 103 and/or other servers, thereby generating an interfacing unit, such as a user interface, on the display. To this end, the client application 154 may comprise, for example, a browser, a dedicated application, etc., and the interfacing unit may comprise a network page, an application screen, etc. The client device 106 may be configured to execute applications beyond the client application 154 such as, for example, email applications, social networking applications, word processors, spreadsheets, and/or other applications.

Next, a general description of the operation of the various components of the networked environment 100 is provided. To begin, a generator module 121 can be configured so that for each execution of an element generation, the generator module 121 outputs one or more element representations 148. Element representations 148 are entities representing one or more of a set of instructions, data structures, data, values, information to generate interfacing units (i.e., interfacing unit plans 136), one or more interfacing unit elements 145, and/or data structures, data, values, information constituting interfacing units and/or one or more interfacing unit elements 145. Moreover, element representations 148 can also be configured as modules, element representation modules 124. Outputted element representations 148, for example, can also represent mutable and/or immutable data structures.

Modules, such as the generator module 121, the element representation module 124, the planner module 127, the representation module 130, the state module 118, and so forth, can be configured such as entities representing one or more of a set of instructions, data structures, data, values, information, and inputs.

A generator module 121 can include a set of instructions detecting changes of inputs, states, data structures, values, or any other relevant data and/or information affecting one or more element representations 148. If the relevant data remains the same, the generator module 121 outputs an already stored element representation 148 from the data store 112, while generating a new element representation 148 in the opposite case when the relevant data does not remain the same. For example, the stored element representations 148 can exist in persistent memory structures of the generator module 121, the element representations 148 may be shared between modules, or may exist in another part of the computing environment 103. Inputs processed by generator modules 121 and/or other modules may have no restrictions. For example, the inputs can be any entity, states, instructions to be executed, data structures, data, information, values, generated element representations 148, and/or other generator modules 121.

Work of art competition systems 115 can be required to update the interfacing unit elements 145 and the correlated architectures as related data and/or entities change. Element representation 148 generation procedures and generated element representations 145 involve supplemental memory, processor time, and power to carry out updates. In various embodiments, the generator modules 121 avert additional executions of element representation 148 generations and creations of element representations 148, which reduces memory consumption, accelerates processor operations, and utilizes less processing power to achieve updated competition systems by storing inputs, states, and entities associated with the element representations 148. The generator modules 121 can execute comparative operations on the element representations 148, connecting the stored associated entities with the associated entities that would be used for the next element representation 148 generations and/or creations of element representations 148.

A greater benefit is realized with an increased volume of updates. The process of conducting competitions involving works of art is capable to handle more volumes of information and operations due to the adoption of the generator module 121. For example, a ranking module comprising position numbers, artist names, and their score points may be continuously updated as every artist engages in competitions, earns and loses points, and moves up or down in the ranking. The music genre ranking can include a multitude of artists continuously operating in the work of art competition system 115. A generator module 121 can process an extremely high quantity of granularly updated ranking versions in just milliseconds. Part of their ranking data can be still congruous with the previous data. The process may operate only on the new data that is incongruous with the previous ranking data, and then may make use of the already processed data that is congruous between the current and newer ranking version.

A planner module 127 can be configured to compare the current interfacing unit plan 136, comprising one or more element representations 148, which in turn can have children and sibling element representations 148 or be the main, a superordinate, a subordinate, an equal ordinate, and/or first or last element representation 148, with the new element representations 148 received by generator module(s) 121. The planner module 127 can be further configured to directly reference element representations 148 that the planner module 127 received from generator modules 121, or the planner module 127 can build its element representations 148 from the data of the received element representations 148.

The interfacing unit plan 136 can be construed and structured following any model, or including one or more models, such as graph, list, set, multiset, tree, queue, priority queue, map, multi map, container, array, collection and/or a stack. Every element representation 148 may hold specific values such as type, a unique identifier, properties, attributes, and/or superordinate, subordinate or equal ladder element representations 148, for example. When comparing the new and current element representation(s) 148 or element representation 148 collections or lists, the planner module 127 can be configured not to compare two element representations 148 if the new and current element representation 148 is of a different type, replace the entire element representation(s) 148, collection, lists, a collection part with the new one. The planner module 127 can be configured only to update data representing its characteristics and additional information on the contrary.

A planner module 127 can be further configured to build and update its element representation 148 data structures and only using the received element representations 148 as a means to perform the building, comparison, update, and/or other processes. Alternatively, the planner module 127 can directly reference and/or integrate the received data structures and/or combine its data structures and the received data structures. The planner module 127 can be additionally configured to constitute one or more data structure to trace the present and newer element representations 148 in order to perform its tasks. The structures in some cases can share data among them and possess any degree of integration and association with any other data structure. Planner modules 127 can associate element representation 148 data structures with any other data structure in order to execute its instructions. For example, a planner module 127 can establish a reference between current element representation 148 data structures with newer element representation 148 data structures and/or between element representation 148 data structures.

A planner module 127 can use identifiers, such as unique identifiers, to place the element representations 148 in the correct order, for example, and to compare the current version of an element representation 148 with a newer one. A planner module 127 can output the interfacing unit plan 136 as a unique optimized operation set to representation module(s) 130, thereby minimizing the system resource usage to build or update the visualized interfacing unit(s) and effecting operations' acceleration. For example, a list, or any type of reference or structure, of state operations (e.g., create, read, update, delete) and/or state interfaces and/or input, data, entities involved in the generation of element representations 148 can be held by the generator module(s) 121 and/or the planner module(s) 127 so that the relevant state changes are performed together resulting in a unique optimized element representation 148 generation, instead of performing one execution for each operation/entity change, which would be performed multiple times and using more resources by the relevant architectures such as the generator module(s) 121 and/or planner module(s) 127.

The issues of in-between, redundant, or long workloads, and/or their representations in the interfacing unit, is therefore greatly enhanced. As demonstrated, the present architectures result in performance increases due to the reduction in time, processing power, memory and bandwidth.

A planner module 127 can also make use of a stack model and/or a queue model and/or recursive or iterative procedures to process the element representations 148 and/or its data structures when elaborating and/or updating the interfacing unit(s) plans 136 and/or to evolve the processing in independent tasks, so as to dynamically organize the execution order. An independent task can be formulated as a data structure associated with one or more element representations 148 and/or any value of one or more element representations 148 or any other data structure.

Specific values, involved inputs, and/or states of element representations 148 can be stored by planner modules 127 together with the element representations 148 to effectively compare it with the new version received. For example, the elaboration can start from the main (or first or last with its respective order) element representation 148 and then elaborate the subordinate element representations 148 including all the equally ranked element representations 148 until all the nested element representations 148 are elaborated. Equally ranked element representations 148 can be processed with a specific direction.

Planner modules 127 can be configured to collect all the inputs and states related to each element representation 148, and the element representations 148 themselves, and constitute a list. Such a list can be iterated, for example, during the element generation for elaborating the plan and/or comparing the element representations 148, for example, between the new and present element representations 148.

Planner modules 127 can be configured to organize distinct processing queues for element representations 148 present in the list or representation not in the list. A planner module 127 can be additionally instructed to determine whether an element representation 148 has associated states and/or inputs. The aforementioned presence or absence can determine whether a planner module 127 can adopt concurrency or parallelism for the processing of an element representation 148 or if the planner module 127 undertakes sequential processing. Planner modules 127 can line all the element representations 148 able to be processed sequentially in a first queue in a queue system 133, and element representations 148 able to be processed concurrently or in parallel in a second queue in the queue system 133. Planner modules 127 can be configured to process the inputs and/or states involved with element representations 148 all at once during the conclusive stages of a plan elaboration.

Operations, such as create, read, update, and delete operations, on the inputs and states related to element representations 148 can be performed by generator modules 121, planner modules 127, or other modules. For example, generator modules 121 can output the results of such operations or instead the operations can be executed by planner modules 127 when elaborating the element representation 148 plans. For example, in scenarios where the generated element representations 148 result always in the same element representations 148 if inputs, data, entities, and state values used to generate them are always the same, a planner module 127 can compare the new inputs and/or states used to generate element representations 148 with the current ones, without the involvement of other procedures such as one to one value comparison or immutability comparison models.

Planner modules 127 and/or architectures running such instructions can be enabled to execute operations faster as they are now able to identify and differentiate tasks which may or may not involve specific procedural steps such as sequential processing or parallel and/or concurrent processing, for example. The ability to differentiate, for example, between operations that need to be executed in a specific order and operations which do not, effects a reduction of operation time, as the systems are precisely instructed on which tasks can be speeded up and run at the same time and which tasks require to wait.

The architectures can involve hashing instructions, for example, when generating and/or comparing data structures. Hashes can also determine if element representations 148 have changed since the first generation, what specific values have changed, or if the processor is dealing with entirely new element representations 148. This applies regardless of the data scheme the work of art competition system 115 is using such as mutable or immutable data design, for example. Immutable data structures can be used to manage plan elaboration between present element representations 148 and newer element representations 148.

An immutable element representation data design can instruct the processor to determine the change by comparing the memory location of the element representations 148, and recursively or iteratively process the entire element representation 148 model. Planner modules 127 can be instructed to begin the elaboration from the main or first representation structure to last nested representation structures and using a specific direction upon encountering a collection or list of representation structures.

Generator modules 121 can be configured, for example, to assign to inputs and/or states involved into representation generations precedence values and/or integrate the element representations 148 into a precedence ranking system allowing planner modules to give more or less precedence to some element representation 148 inside a representation generation or between complete representation generations. Such precedence values and precedence ranking system, for example, can be organized by planner modules 127 or other modules. The precedence system can be organized implementing a tree data structure formed by item data structures consisting of a value and a maximum of two subordinate items. The precedence order of the items can define that the superordinate item value may be smaller or equal than the subordinate items or superordinate item value may be greater or equal than the subordinate items.

Generator module(s) 121 can be structured as an entity also capable to store and persist values, data structures, data, information, inputs and states. Generator module(s) 121 may also interface with other modules and/or architectures instructed to store and/or persist. Generator modules 121 or other architectures can detect when values, data structures, inputs and states change. Changes, for example, can be detected by executing or executing again generation modules or modules, executing interfaces, executing create/read/update/delete interfaces, event architectures, queue architectures, executing instructions during reading, creating, updating, and deleting operations.

Generator modules 121 and/or planner modules 127 can be configured to execute instructions before, during and after any stage of their executions, such as, for example, before starting the element representation 148 generations or before outputting the results of its operations to planner modules 127, and/or during the processing of planner modules 127 or before a planner module 127 outputs a plan. Additionally, generator modules 121 and/or planner modules 127 can execute instructions after the representation modules 130 have built the interfacing unit. Specific instructions can be assigned for the first ever element representation 148 generation and/or the successive generations. Also, instructions can be performed in response to generator modules 121 or other modules being deleted such as, for example, before, during and after. Generator modules 121 can be further configured to persist element representations 148 and/or their data in state modules 118 or in other architectures.

Moreover, states, data, information, inputs, and instructions can be associated to stage specific runners in order to evaluate their changes and determine if and/or when the runner and/or its instructions have to run. Configurations can be configured to run only if associated entities have changed, been removed, or been replaced by other entities. Configurations can include instruction sets to be run before, during, and after any procedure. For example, operations, create/read/update/delete interface operations and/or operations on states can be executed as one enhanced operation instead of multiple runner executions. For example, it additionally benefits modules, architectures, runners, instructions that are associated with entities that are manipulated because the associated entity set group has undergone all processing as specified by the instructions, and there will not be one execution per entity when there is no requirement or benefit to do so, otherwise instructions can still be configured to run one execution per change. Configurations can run at specific stages, and the instructions can be configured to be run or to be deferred or to run regardless of the specific instruction configurations.

For example, the applied architectures prevent the interfacing unit to be blocked by executing a selected instruction after the representation module 130 has built and/or updated the visualized interfacing unit when beneficial to do so. In other examples, the applied architectures run a selected instruction before a precise stage such as building and/or updating the visualized interfacing unit to prevent the visualization of unnecessary or in progress interfacing unit updates by the users which additionally brings a further performance improvement because fewer interfacing unit versions are visualized and less system resources are consumed when beneficial to do so. Moreover, the applied architectures can also improve the interaction consistency by preventing users from interacting with temporary or in progress versions of the visualized interfacing unit.

Planner modules 127 using their own stack models, for example, can be further configured to identify the generated element representations 148 and assign them an higher or lower precedence. The stack models can be further complemented with queue models. The planner modules 127 can process generated element representations 148 in parallel or concurrently instead using of sequential methods. The planner modules 127 can also be able to start, suspend, restart, or delete the elaboration of one or many generated element representations 148 at the same time. The planner modules 127 can be further configured to incorporate iteration statements and/or iteration procedures, such as, for example, to process or transform data or to acknowledge operation fulfillments, to handle concurrent or parallel operations, to process instructions according to the precedence system, and/or to remit values during the executions. The iteration procedures can organize the iteration and execution in succession, and each can be representative of the start or end of each task and/or the entire representation generation processing. For example, during the stage representing the end of a task, planner modules 127 can process a list containing element representations 148 associated with inputs and/or states. The former configuration examples can be include running recursive statements and/or recursive procedures.

Event driven architectures can be further integrated into the work of art competition system 115. For example, events can be responsible of changes of inputs and/or states and/or element representations 148, therefore starting the execution of state modules 118, generator modules 121, planner modules 127, representation modules 130, other modules, and/or any other instructions connected with an event. Event architectures can be further implemented by planner modules 127, for example, to organize task execution in conjunction with other models such as stack models and queue models.

Independent task data structure formulation can include time related data such as time estimations, restrictions, measurements and records and/or precedence values (bits, numbers, Booleans, strings, sets, or any other data type for example) to execute one or more tasks. The instruction order, when utilizing any capable model, can arise independently and the set of instructions can be executed in a different time, such as, for example, deferring the instruction set until a condition is met or apply preemption procedures and/or prepend tasks.

Event architectures can be implemented such as exposing interfaces for data transmission and reception to one or multiple recipients. Further configurations can include serialization of data structures. Event data structures can be a clone of the data received from the event system and/or defined with a proper type. Moreover, data structures can be transmitted to be associated with another data structure and optionally delete any previous association or accessibility.

Planner module 127 can be configured to splinter operations into multiple sets of executable operations and/or processable entities, data, values, data structures, information, instructions by planners or other modules. For example, the planner module 127 may splinter operations to manage unexpectedly long operations and to allow interfacing units to be manipulated. Moreover, splinters can allow any degree of concurrent or parallel execution of different type of operations with any number of execution threads. For example, interactivity events can transmit data, information, representing that the plan in elaboration is not more relevant. Therefore, the planner module 127 can be configured to delete the plan and elaborate a new plan.

In this regard, the planner module 127 can stop the elaboration in progress, without completing the plan first and immediately start to elaborate and output a new plan. For example, a voter may be listening to a competition between two artists and their works of art via the work of art competition system 115. The user then clicks to navigate to the user's own profile. In this case, the planner module 127 is outputting the interfacing unit for the competition and the associated media streaming such as the song tracks. The described architectures allow the planner module 127 to dynamically delete the current plan and immediately start to elaborate and output a new plan (i.e., the listener's own profile), so as to determine a performance improvement and superior interfacing experience. The architecture can be configured to process events with specific instructions to be executed for a particular event associated with a particular element representation 148 or to act on the received data, information, executing default instructions without additional instructions inside generator modules 121, in other parts of the architectures, or in a combination of the two procedures.

Planner modules 127 can be configured to elaborate and output plans to the representation modules 130 according to precedence systems. The planner modules 127 may take into account one or many factors related to the precedence systems. For example, planner modules 127 can stage a data structure for a representation generation and assessment according to the precedence values (bits, numbers, Booleans, strings, sets, or any other data type, for example). Other factors may be, for example, a work completion time limit and/or estimation. The planner modules may output only a part of the generation initially and successively output the rest. The stage structure can integrate new representation generations with the remaining representation held into the structure.

As an example, on the reception of data by interactivity events, the architectures, by implementing the instructions, can stop the elaboration in progress, without completing the plan first, improving the efficiency. Time, memory, processing power, and bandwidth may be saved as the unelaborated rest of plan in progress, made outdated by the event in this example, is not processed. Moreover, for example, as the planner modules 127 are now able to output a plan to representation modules 130 while still elaborating the plan by using stack models and independent task data structure formulation. The users can receive the interfacing unit faster without the requirement of waiting the entire representations set to be fully processed. Planner modules 127 can also be able to allocate more time, memory, processing power, and bandwidth with a precedence system to specific parts of architectures and/or element representations 148. This improves the user experience as the system resources are primarily directed towards the parts of the interface the users are more interested in, focused on, and/or are interacting with. This can also improve the performance as the architectures can be allowed to suspend any processing activity for parts ranked lower in a precedence system for specific cases.

Architectures (or generator modules 121, planner modules 127, or other modules and/or instructions) can be configured to defer the execution of the entire instruction set, execute the entire instruction set and/or partly execute and defer instructions. For example, the architectures may run immediately specific statements and/or instructions and/or defer other instructions in the same instruction set.

For example, architectures can be configured to organize a queue from the queue system 133 for instructions, inputs, states, data, information, events, user interaction events which execute (and/or cause) changes of interfacing units and assign it specific (or lower/equal/higher) precedence rank and/or insert them in a specific (or lower/equal/higher) precedence queue and/or other queues with different precedence rankings. For example, entities, instructions, events, user interaction events, inputs, states, data, or information that do not execute and/or cause changes to the interfacing unit and/or do not have to be immediately run and integrated with event and/or interactivity architectures may be inserted into a queue.

Queues can also be organized for specific types such as events, interaction events and/or for instructions or entities that modify the way the architectures run and/or process. A queue can be constituted and integrated for event architectures causing changes on how the architectures process instructions and/or data effectively to run in order, unordered, in parallel, and/or concurrently.

Queue systems 133 can be structured as queues to be executed in order and/or queues that do not require to be executed in order. Instructions, inputs, states, data, information, events, user interaction events executing (and/or causing) interfacing unit changes can be executed in order, while they can be executed unordered, concurrently and/or in parallel if they do not modify interfacing units and/or are not associated to interactivity and event architectures. For example, given an instruction set, configurations can execute instructions that do not modify interfacing unit representations and defer the execution of instructions modifying the interfacing units after the element representation 148 generation or any other procedure, such as plan elaborations. Or the configurations may execute both types of instructions or defer both types of instructions.

Configurations can be instructed to immediately process instructions (and in order, for example) originating from user interactivity architectures and defer other operations such as state module 118 operations and/or operations causing interfacing units to be modified. In addition, architectures can be configured to process in order events requiring the prior events to be processed before processing the new events and their instructions implementing queues, stacks, event processing structures and/or any other architecture.

When running an instruction or instruction set, architectures can enqueue to a specific precedence queue any direct and indirect modifier of interfacing units and to a specific queue instructions or data that do not modify interfacing units and/or instructions or data related to the interactivity and event architectures of interfacing units. For example, modifiers and related to the interactivity and event architectures of interfacing units, can be processed in the same queue in conjunction with concurrent and/or parallel architectures. In addition, architectures can be implemented singularly, in conjunction and/or by any combination. Moreover, any sequential, concurrent, and/or parallel architecture can be configured to allow any degree of concurrency, parallelism, or sequential processing.

For example, the computing environment 103 can be configured to use time records and limits as precedence values to manage operations and/or entities. Time ranges can additionally be configured to cluster operations and/or entities associated with time records and limits. Moreover, precedence values can be represented by numbers, bits, Booleans, strings or any other type. Sets, for example, sets of bits (e.g., numbers or Booleans) can be implemented to represent one or more precedence values and their queues 133. Bitwise operations and shifts can be performed to read and manipulate precedence values represented in bits and/or sets of bits including one or more bit precedence values, assess the precedence and/or the ranking of any operation, instruction or entity, or rely on different level operations. For example, numbers and Booleans and their respective processes can be used to carry out operations (or any create, read, update, delete, join, and/or merge operations on one or more precedence values).

The computing environment 103 can assess the presence of work to be performed by evaluating whether time values and/or bit precedence values are set, also including sets of precedence values, for example. Architectures can be configured to share precedence values and sets of precedence values with superordinate, subordinate, or equal ordinate entities. Moreover, the architectures can be instructed to change precedence values and queues of entities and operations. Configurations can use the existence or the absence of precedence values and/or sets of precedence values to determine change(s) or update(s) inside the computing environment 103. These evaluations can be additionally utilized to optimize operations as modules associated with changes or updates may be executed again, while modules without change(s) or update(s) are not. Configurations can be instructed to use sets of values representing precedence queues to work on tasks belonging to different queues 133 concurrently and/or in parallel. As an example, a queue value set can allow a lower precedence task to be performed while a higher precedence task is waiting for data of a network request without performing any operation. For example, entities associated with an element representation 148 may be assigned a precedence value. The precedence value of the element representation 148 may be representative of a set representing the values of its associated entities and/or representative (and/or inclusive) of the associated (and/or subordinate) element representation precedence value(s).

As another example, a queue system 133 can be configured including a top precedence queue, a queue for events that are caused to execute more than once, a standard queue, a minor precedence queue, and a "waiting state" queue. More queues can be added, as explained above, such as numbered queues. Precedence values, in any form of implementation, can be representative of any entity, such as instructions, modules, data structures, data, values, information, inputs, numbers, bits, Booleans, strings and sets, for example.

The computing environment 103 can be configured to record execution times and employed resources for modules and/or architectures in order to monitor the performances allowing optimal configurations to better manage general and/or specific operations. Monitoring interfaces can be combined with state modules 118, generator modules 121, planner modules 127, representation modules 130, other modules, architectures, independent task data structures, generation executions, entities, or any operation.

Architectures and/or modules can be configured, to postpone the gathering of instructions and/or modules until a condition is met or required to execute operations, and/or selectively execute operation(s) when determining which instruction to run. Moreover, the architectures and/or modules can implement instructions to start, suspend, restart or delete the interface-ability with other modules, architectures, or their inputs, outputs, and changes, such as, for example, a set of instructions, modules, data structures, data, values, states, and element representations 148. Instructions can be run to identify and collect one or more data to generate identification structures to allow architectures and/or modules to execute create, read, update, delete, and/or comparing operations. Architectures and modules can be constituted as one or more superordinate, subordinate, or equal ordinate entities.

All the architectures and their instructions can be executed on networked computer systems. Networked architectures can provide performance increases and superior user experiences. For example, a computing environment 103, executing generator modules 121 and/or planner modules 127 can provide representation plans to representation modules 130 running on another computer system. Networked computer systems can also run the same architectures and process the received outputs from the architectures running on networked systems to execute the same architecture on the receiver computer systems. For example, a computing environment 103 running generator modules 121 and/or planner modules 127 provides a representation plan to representation modules 130 running on another computer system. The representation modules 130 can be configured to build interfacing units as soon as one or more data independent entities, in this case interfacing unit element representations 148 (and/or related data) are provided. The representation modules 130 may be in the process of receiving the whole representation plan at the same time. The generator modules 121, planner modules 127, and/or other modules running on the provider system can process each independent entity differently, for example, a voter profile interface, an interfacing unit consisting in multiple elements and other interfacing unit, can take more time to process. The interface representing the voter statistics may take more time to process than an element representing only the voter name. Additional data are involved and/or more processing is executed to provide the desired output.

The receiver modules can be configured to process the data entities independently at the moment they are received, adopting concurrency and/or parallelism models. The interfacing unit is consequently built faster without deferring the representation execution until the whole representation plan is completed and building of element representations 148 can begin in any order.

The planner modules 127 can be configured to define element representations 148 as ordered independent data entities and/or unordered independent data entities, and to combine the definitions inside the same representation plan. Further configurations can execute a default order to process unordered independent data entities, such as the position they hold and/or would hold in the whole element representation plan. The default order can be supplanted by precedence architectures and/or event architectures or any other architecture.

The planner module 127 can be further configured to utilize substitutes for element representations 148 (and/or their related data) to be replaced with the original independent data entities. Specific values can be added to an element representation 148 to define, for example, if the element representation 148 is an original element representation 148 or is a substitute, an identifier, or if the data is and/or includes an unordered independent entity.

Definitions can be present in element representation 148 structures to be used by the modules to execute the instructions they hold. Definitions can assume any form, such as, for example, extra information such strings and/or notations, and implemented as meaningful values for modules to determine how and/or where operate inside the element representation 148 structures or any other data structure. Definitions can designate the structure of one or more element representations 148 and/or a portion thereof. For example, the start and/or the end of one or more unordered independent data entities and/or their replacement structures. Definitions may also instruct other architectures, running on other computer systems, for example, to process themselves the designated parts of the element representation 148 structure or any other data structure.

Element representation 148 structures can include executable instructions to be used by other modules on other computer systems. For example, the instructions may include instructions for supplanting the replacement structures with the original structures.

Specific values such as identifiers, for example, can be incorporated for supplanting operations. When an architecture receives an element representation plan elaborated from another networked architecture, the architecture can further elaborate the plan to fully integrate the received plan with the architectures or modules. The performance is increased as the representational structures of the element representation plan is already built. Therefore, the architectures can directly execute the integration procedures, leading to less resource consumption and faster operations. For example, a received plan that is built and shown, can be associated to event architectures and interactivity architectures and/or any other architecture.

For example, a built interfacing unit plan 136 is processing an original data structure, while a user interacts with another replacement structure. The architectures can be instructed to pause the current processing to give precedence to the processing of the original data structure associated with the replacement the user has interacted with. Extra definitions, as example, can be used to determine superordinates, subordinates, or equal ordinates or any other relationship to be assigned an higher, lower, or equal precedence.

Networked architectures can cooperate to establish which architecture performs which operations. For example, element representation generations can be carried out by one or more networked architectures. A networked architecture can output a dynamic elaboration plan 151, which includes generated element representations 148 as per its configuration and incorporates instructions for the receiving networked architecture to perform the other element representation generations on its computer system. Further configurations can include serialization and deserialization of dynamic elaboration plans 151 and replacement procedures for structures or models that cannot be serialized.

Establishing a cooperation plan 142 can include implementing identifiers, architecture identifiers, extensions, and/or any supplemental data or metadata. The instructions to perform, as representative of any kind of entity, statement, or data structure, can incorporate the entire set of instructions and/or only incorporate an identifier and/or an address, both of any form, by which the receiver architecture retrieves the instructions to perform. Replacement models can be processed independently. Receiving models can be implemented for retrieving networked architectures in the process of elaborating the entity related to the instructions to perform.

The cooperation plan 142 can include configurations that instruct networked architectures to perform the operations expected to be carried out by another networked architectures for any reason, such as errors, for example. Dynamic plan configurations can also include anything previously mentioned such as replacement models or processing independently and receiving models and be adopted by providers, receivers, and any networked architectures, for example. Networked architectures' inputs and outputs and/or entity representing instructions to perform may be unrestricted. The inputs, outputs, and entities can be constituted by any structure or value and/or transitional model. The architectures can start from any transitional stage and continue to process and integrate until completion.

State module(s) 118 can be configured to execute instructions to organize, store, and manage state data, values, and data structures. The architecture can incorporate, for example, one state module 118 for one or more states. The state modules 118 can incorporate interfaces to retrieve data or instructions and execute instruction statements to further manipulate data or instructions. Moreover, the state modules 118 can perform create/read/update/delete operations on their states and apply data models, such as immutable or mutable data design models. Each state operation can be assigned to a specific type and/or value and be associated with instructions to be executed on an occurrence of one or more specific type to output one or more versions of the state(s) as required by the implemented models. States and their versions can be integrated and/or result in one or more states. Instructions can include previous states to perform their operations or to integrate them into outputs. State operations can be incorporated inside iterative or recursive procedures and/or event and/or queue models. State architectures can expose interfaces to other modules, architectures, networked architectures, or computer systems to manipulate their states, operations, and/or cooperate in operations on states. State architectures may allow other parts of the entire architecture to execute create/read/update/delete operations and trace changes. State modules can transmit states, data or information related to state changes. State modules can be configured to expose state data, structures, and retrieval interfaces from which modules independently have access to the states. State module(s) 118 and their data and interfaces can be received also as inputs by other modules and/or be constituted as superordinate module(s) from which the data is gathered.

State modules 118 can run enhanced instructions to optimize its states, preventing data duplication, out of order data, or expired data. For example, the relevant data can be searched for and only added if it is not found. Overwrite operations will succeed only if the presumed new data is not outdated or delete operations will execute deletion only if data is found. Read operations can be allowed to directly replace data. Create, update, or any other operation can be configured to create holding structures and/or superordinate structures for the data to be created and/or updated. Operations can be turned into another type of operations such as, for example, an update operation into a create operation, if the relevant data is not found, for example.

State modules 118 can incorporate structures to record the performed data operations and instructions to delete unnecessary records. Delete operations can be traced and associated with the respective create operation to ensure the specific order of execution. Read operations, can trace all the create/read/update/delete operations performed on its data and establish if the gathered information is duplicated, outdated, or to be deleted, compared to the stored data and/or received previously. Moreover, read operations can adopt iterative or recursive procedures to determine the relevancy of each entity constituting data, or compare the data to already stored data or to architecture instructions or received instructions.

State modules 118, and/or other architectures and/or associated modules, can be further configured to additionally improve the performances to integrate dynamic networked interfaces for create/read/update/delete operations. Networked state modules 118 can establish perpetual connections to computer systems conducting works of art competitions and/or performing operations to enable conducting works of art competitions. Perpetual data gathering architectures allow state modules 118 to optimize their operations. Networked state modules 118 can receive data as the data becomes available from the computer systems without executing further or continuous retrieval operations. Networked state modules 118 can receive the operation type and the data to be processed and execute the instructions on the states. In addition, the state modules 118 can also receive instructions to execute retrieval operations, for example, statistics including the number of comments the voter created.

The state modules 118 receive from the work of art competition system 115 instructions to retrieve for example, the number of comments created, from perpetual data gathering architectures and/or networked interfaces. On perpetual data gathering architecture instructions and/or gathering instructions by networked interfaces, state modules 118 can accurately execute retrieval operations strictly of the data that the state modules 118 are instructed to process at that moment.

Networked state modules 118, configured to receive create/read/update/delete operation commands and the relevant data, and receive instructions to retrieve, can dynamically and independently execute models that result in performance improvements. For example, specific state modules 118 can receive specific instructions or operation commands executing different operating models, or the state modules 118 can receive new specific instructions to apply to state data that was processed differently until the execution of the new instructions.

The terms "visualized" or "shown" do not restrict the description to a particular interfacing unit but are meant as a reference to any interfacing unit that can be perceived in any manner and be able to be the object of cognitive functions. Entities, data structures, and other definitions above are listed for illustrative purposes only and are not meant as limitation. In fact, any other construct may also be included, such as functions, classes, objects, and bitmasks, for example. Any architecture can be implemented for any module capable of being utilized for conducting competition involving works of art.

Figure 2:
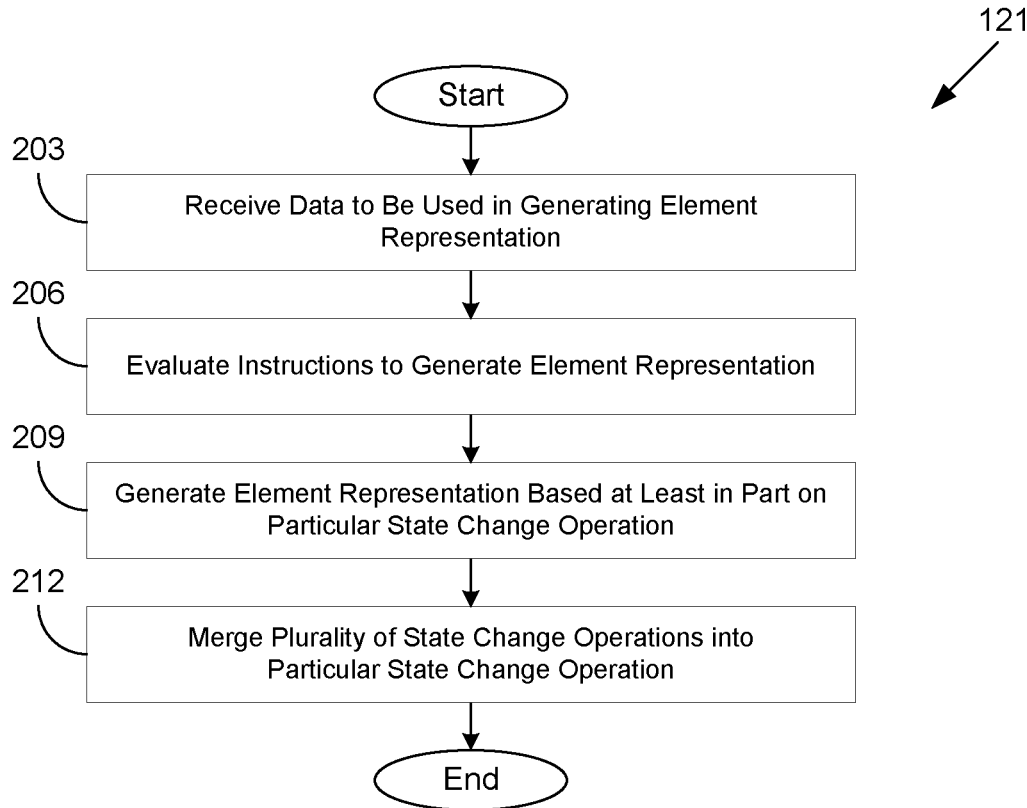
FIG. 2 is a flowchart illustrating one example of functionality implemented as portions of a generator module executed in a computing environment in the networked environment of FIG. 1 according to various embodiments of the present disclosure.

Referring next to FIG. 2, shown is a flowchart that provides one example of the operation of a portion of the generator module 121 according to various embodiments. It is understood that the flowchart of FIG. 2 provides merely an example of the many different types of functional arrangements that may be employed to implement the operation of the portion of the generator module 121 as described herein. As an alternative, the flowchart of FIG. 2 may be viewed as depicting an example of elements of a method implemented in the computing environment 103 (FIG. 1) according to one or more embodiments.

Beginning with box 203, the generator module 121 receives data to be used in generating an element representation 148. In box 206, the generator module 121 evaluates one or more instructions to generate the element representation 148. In box 209, the generator module 121 generates the element representation 148 based at least in part on a particular state change operation. The generator module 121 is configured to generate a single element representation 148 after merging a plurality of state change operations into the particular state change operation. In other scenarios, the generator module 121 may generate the element representation 148 even if the state does not change. For example, at the start of a session after a login, the generator module 121 may generate the element representation 148 without a state change and without merging a plurality of state operations. Alternatively, the generator module 121 may generate an element representation 148 without a state being associated with the element representation 148. In box 212, the generator module 121 merges a plurality of state change operations into a particular state change operation. Thereafter, the operation of the portion of the generator module 121 ends.

Referring next to FIG. 3, shown is a flowchart that provides one example of the operation of a portion of the planner module 127 according to various embodiments. It is understood that the flowchart of FIG. 3 provides merely an example of the many different types of functional arrangements that may be employed to implement the operation of the portion of the planner module 127 as described herein. As an alternative, the flowchart of FIG. 3 may be viewed as depicting an example of elements of a method implemented in the computing environment 103 (FIG. 1) according to one or more embodiments.

Beginning with box 303, the planner module 127 receives an element representation from the generator module 121. In box 306, the planner module 127 assigns an identifier, such as a unique identifier, to the element representation 148. For example, the planner module 127 may assign an identifier to the element representation 148 in order to order the element representation 148 with the previous element representation 148. In another example, the planner module 127 may use another identifier in order to insert the element representation 148 into the queue system 133. In box 309, the planner module 127 orders the element representation 148 based at least in part on the identifier assigned to the element representation 148. In box 312, the planner module 127 assigns a precedence value to the element representation 148. In box 315 the planner module 127 generates a plan for an interfacing unit based at least in part on the element representation 148. In box 318 the planner module 127 receives an event, such as a user interactivity event, an expiration event, a notification event that generates changes in the interfacing unit, and/or any other type of event, via the system For example, suppose that a user is participating in a work of art competition and the competition expires. The system may be configured to close the current interfacing unit and generate a new interfacing unit to bring the user back to a previous location. In box 321, the planner module 127 dynamically deletes the current plan in response to the event. In box 324, the planner module 127 generates a different plan for the interfacing unit in response to the event. Thereafter, the operation of the portion of the planner module 127 ends.

Figure 4:
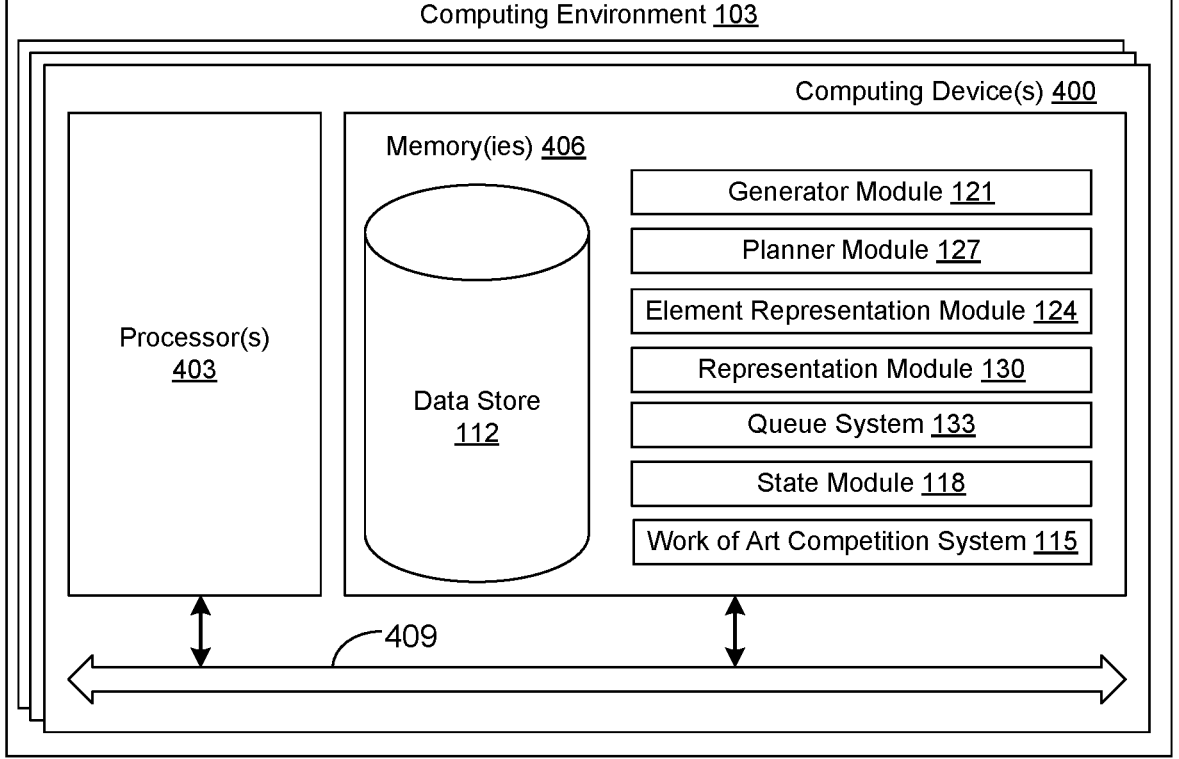
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are a work of art competition system 115, one or more state modules 118, one or more generator modules 121, one or more element representation modules 124, one or more planner modules 127, one or more representation modules 130, a queue system comprising one or more queues 133, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PUP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the work of art competition system 115, the state modules 118, the generator modules 121, the element representation modules 124, the planner modules 127, the representation modules 130, the queue system 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the generator module 121 and the planner module 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the work of art competition system 115, the state modules 118, the generator modules 121, the element representation modules 124, the planner modules 127, the representation modules 130, and the queue system 133, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the work of art competition system 115, the state modules 118, the generator modules 121, the element representation modules 124, the planner modules 127, the representation modules 130, and the queue system 133, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 400, or in multiple computing devices 400 in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device;
a generator module executable in the at least one computing device, wherein when executed the generator module causes the at least one computing device to at least:
    receive data to be used in generating an element representation;
    evaluate instructions to generate the element representation; and
    generate the element representation, wherein the generator module generates the element representation based at least in part on a particular state change operation, wherein the generator module is configured to generate a single element representation after merging a plurality of state change operations into the particular state change operation; and
a planner module executable in the at least one computing device, wherein when executed the planner module causes the at least one computing device to at least:
    receive the element representation from the generator module; and
    generate a plan for an interfacing unit.

2. A system, comprising:
at least one computing device;
a generator module executable in the at least one computing device, wherein when executed the generator module causes the at least one computing device to at least:
    receive data to be used in generating an element representation;
    evaluate instructions to generate the element representation; and
    generate the element representation; and
a planner module executable in the at least one computing device, wherein when executed the planner module causes the at least one computing device to at least:
receive the element representation from the generator module;
    generate a plan for an interfacing unit;
    The system of claim 1, wherein the planner module is further configured to at least:
    assign a first identifier to the element representation to order the element representation relative to at least one previous element representation;
    order the element representation in a queue system comprising one or more queues based at least in part on the first identifier or a second identifier;
    assign a precedence value to the element representation; and
    wherein the plan for the interfacing unit is generated based at least in part on the element representation.

3. The system of claim 1, wherein one or more modules are configurable with computing architectures for work of art competitions.

4. A system, comprising:
at least one computing device;
a generator module executable in the at least one computing device, wherein when executed the generator module causes the at least one computing device to at least:

receive data to be used in generating an element representation;
    evaluate instructions to generate the element representation; and
    generate the element representation; and
a planner module executable in the at least one computing device, wherein when executed the planner module causes the at least one computing device to at least:
    receive the element representation from the generator module;
    generate a plan for an interfacing unit;
    receive an event;
    dynamically delete the plan that is currently being generated in response to the event; and
    generate a different plan for the interfacing unit in response to the event.

5. The system of claim 4, wherein the planner module is further configured to splinter a particular operation into a plurality of operations.

6. The system of claim 4, further comprising a state module executable in the at least one computing device, wherein when executed the state module causes the at least one computing device to at least:
manage one or more states;
perform at least one of: a create operation, a read operation, an update operation, or a delete operation on the one or more states; and
expose one or more interfaces to interact with the one or more states.

7. The system of claim 6, wherein the state module is further configured to at least maintain a network connection to a work of art competition system.

8. A system, comprising:
at least one computing device;
a generator module executable in the at least one computing device, wherein when executed the generator module causes the at least one computing device to at least:
    receive data to be used in generating an element representation;
    evaluate instructions to generate the element representation; and
    generate the element representation;
a planner module executable in the at least one computing device, wherein when executed the planner module causes the at least one computing device to at least:
    receive the element representation from the generator module; and
    generate a plan for an interfacing unit; and
a state module executable in the at least one computing device, wherein when executed the state module causes the at least one computing device to at least:
    manage one or more states;
    perform at least one of: a create operation, a read operation, an update operation, or a delete operation on the one or more states; and
    expose one or more interfaces to interact with the one or more states,
wherein the state module is further configured to at least prevent data duplication, out of order data, and expired data.

9. The system of claim 1, wherein the element representation further comprises an element representation module executable in the at least one computing device, wherein when executed the element representation module causes the at least one computing device to at least:

generate one or more interfacing unit elements based at least in part on at least one of: a set of instructions or one or more data structures.

10. The system of claim 1, further comprises a representation module executable in the at least one computing device, wherein when executed the representation module causes the at least one computing device to at least:

receive the plan for the interfacing unit from the planner module; and generate the interfacing unit based at least in part on the plan for the interfacing unit.

11. A computer-implemented method, comprising:

receiving, by a generator module, data to be used in generating an element representation;

evaluating, by the generator module, instructions to generate the element representation;

generating, by the generator module, the element representation;

receiving, by a planner module, the element representation from the generator module;

generating, by the planner module, a plan for an interfacing unit; and wherein the generator module generates the element representation based at least in part on a particular state change operation, wherein the generator module is configured to generate a single element representation after merging a plurality of state change operations into the particular state change operation.

12. A computer-implemented method, comprising:

receiving, by a generator module, data to be used in generating an element representation;

evaluating, by the generator module, instructions to generate the element representation;

generating, by the generator module, the element representation;

receiving, by a planner module, the element representation from the generator module;

generating, by the planner module, a plan for an interfacing unit;

assigning, by the planner module, a first identifier to the element representation to order the element representation relative to at least one previous element representation;

ordering, by the planner module, the element representation in a queue system comprising one or more queues based at least in part on the first identifier or a second identifier;

assigning, by the planner module, a precedence value to the element representation; and wherein the plan for the interfacing unit is generated based at least in part on the element representation.

13. The computer-implemented method of claim 12, further comprising facilitating, by one or more modules, a work of art competition using computing architectures.

14. A computer-implemented method, comprising:

receiving, by a generator module, data to be used in generating an element representation;

evaluating, by the generator module, instructions to generate the element representation;

generating, by the generator module, the element representation;

receiving, by a planner module, the element representation from the generator module;

generating, by the planner module, a plan for an interfacing unit;

receiving, by the planner module, an event;

dynamically deleting, by the planner module and in response to the event, the plan that is currently being generated; and generating, by the planner module, a different plan for the interfacing unit in response to the event.

15. The computer-implemented method of claim 14, further comprising splintering, by the planner module, a particular operation into a plurality of operations.

16. The computer-implemented method of claim 14, further comprising:

managing, by a state module, one or more states;

performing, by the state module, at least one of: a create operation, a read operation, an update operation, or a delete operation on the one or more states; and exposing, by the state module, one or more interfaces to interact with the one or more states.

17. A non-transitory computer-readable medium embodying at least one program executable in at least one computing device, wherein when executed the at least one program causes the at least one computing device to at least:

receive data to be used in generating an element representation;

evaluate instructions to generate the element representation;

generate the element representation;

generate a plan for an interfacing unit;

receive an event;

dynamically delete the plan that is currently being generated in response to the event; and generate a different plan for the interfacing unit in response to the event.

18. The computer-implemented method of claim 11, further comprising splintering, by the planner module, a particular operation into a plurality of operations.

19. The computer-implemented method of claim 12, further comprising splintering, by the planner module, a particular operation into a plurality of operations.

20. The system of claim 2, wherein one or more modules are configurable with computing architectures for work of art competitions.

* * * * *